United States Patent [19]

Orbeck

[11] Patent Number: 5,586,512
[45] Date of Patent: Dec. 24, 1996

[54] SHIP'S HULL VIBRATION DAMPER

[75] Inventor: Finn Orbeck, Sunderland, United Kingdom

[73] Assignee: Orian Technology Limited, Sunderland, United Kingdom

[21] Appl. No.: 232,182

[22] PCT Filed: Nov. 6, 1992

[86] PCT No.: PCT/GB92/02053
§ 371 Date: May 3, 1994
§ 102(e) Date: May 3, 1994

[87] PCT Pub. No.: WO93/09025
PCT Pub. Date: May 13, 1993

[30] Foreign Application Priority Data

Nov. 7, 1991 [GB] United Kingdom ............... 9123644

[51] Int. Cl.⁶ ............................................. B63B 43/00
[52] U.S. Cl. .................... 114/65 R; 114/121; 114/124
[58] Field of Search ............................. 114/65 R, 121, 114/124, 200, 210, 293

[56] References Cited

U.S. PATENT DOCUMENTS

| 4,226,554 | 10/1980 | Vandiver et al. | 405/195 |
| 4,679,800 | 7/1987 | Burton | 114/200 |
| 4,722,293 | 2/1988 | Foster et al. | 114/293 |
| 4,958,805 | 9/1990 | Willamsson | 114/293 |

FOREIGN PATENT DOCUMENTS

| 0098657 | 1/1984 | European Pat. Off. . | |
| 2292897 | 6/1976 | France . | |
| 1961756 | 7/1970 | Germany . | |
| 2519334 | 11/1976 | Germany . | |
| 0166786 | 7/1986 | Japan | 114/124 |
| 417601 | 10/1934 | United Kingdom . | |
| 1289307 | 9/1972 | United Kingdom . | |
| 105782 | 5/1974 | United Kingdom . | |

OTHER PUBLICATIONS

Marine Engineer and Naval Architect, vol. 94, No. 1144, Jul. 1971, London G.B., p. 280 "Tuned Tank Vibration Damper".
Bulletin Technique Du Bureau Veritas No. 1032, May 1973, Paris, pp. 42–54, Bourceau and Volcy "Forced Vibration Resonators and Free Vibration of the Hull".

*Primary Examiner*—Sherman Basinger
*Attorney, Agent, or Firm*—Westman, Champlin & Kelly, P.A.

[57] ABSTRACT

There is described an apparatus for inclusion in a ship comprising a mass (10), that is vibrationally coupled to the ship's hull (12) such that movement of the mass is dampened. The mass (10) is so sized and located as to, when in use it reduces the fundamental and/or harmonics of a transverse two node mode of wave-induced vibration in the ship's hull (12). There is also described an apparatus for inclusion in a ship comprising a mass (10) made up in part of the tackle or fitments of the ship, which also are vibrationally coupled to the ship's hull (12) by a damping such that movement of the mass (10) is dampened so as to thereby, when in use, reduce vibrations in the ship's hull (12). In a preferred embodiment the mass (10) is at least in part a chain locker and that portion of the chain stored therein. By reducing vibrations in the ship's hull (12) significant stresses may be relieved and the performance of the ship enhanced. A ship incorporating the apparatus and a method of reducing vibrations in a ship's hull are also described.

26 Claims, 8 Drawing Sheets

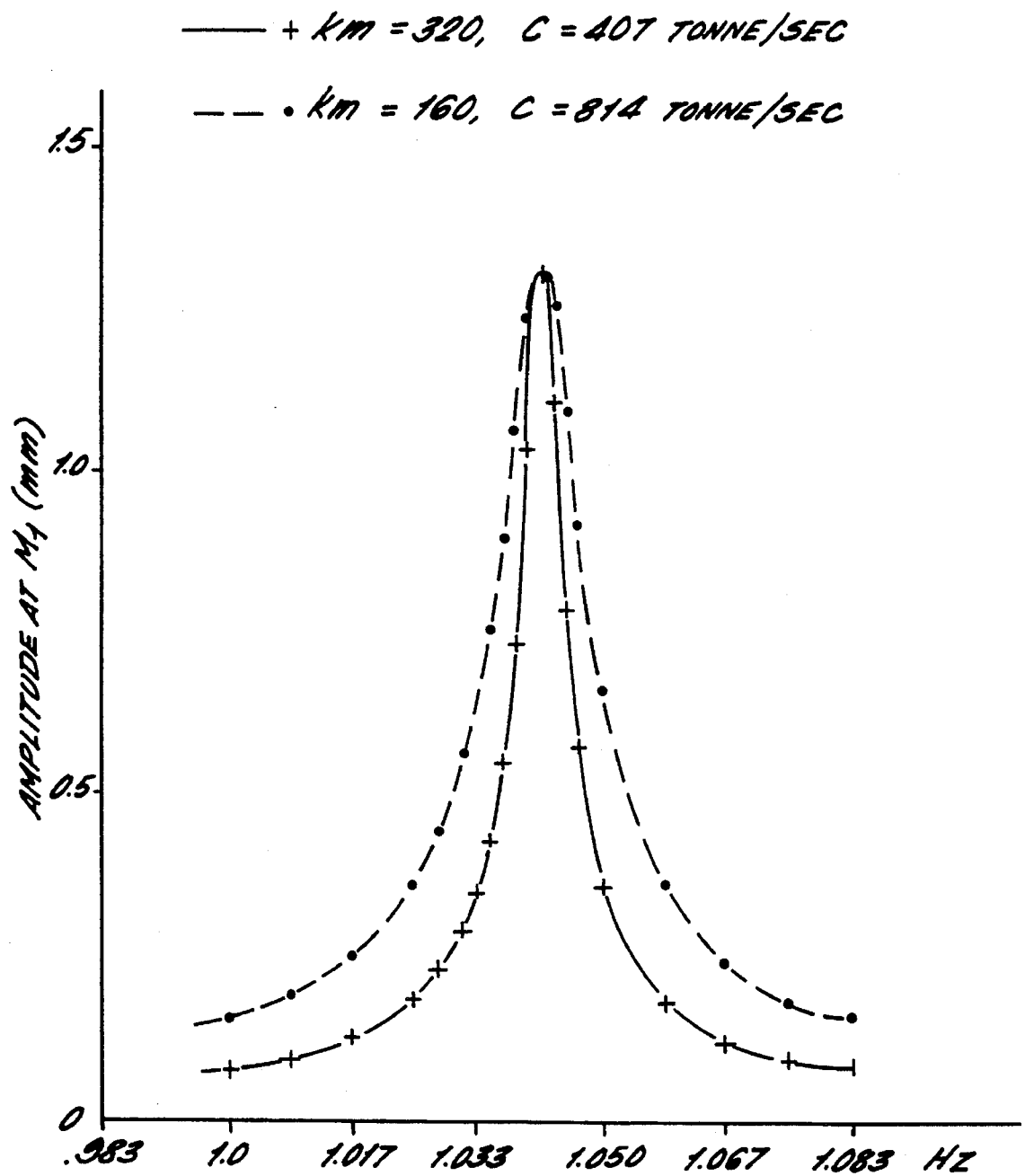

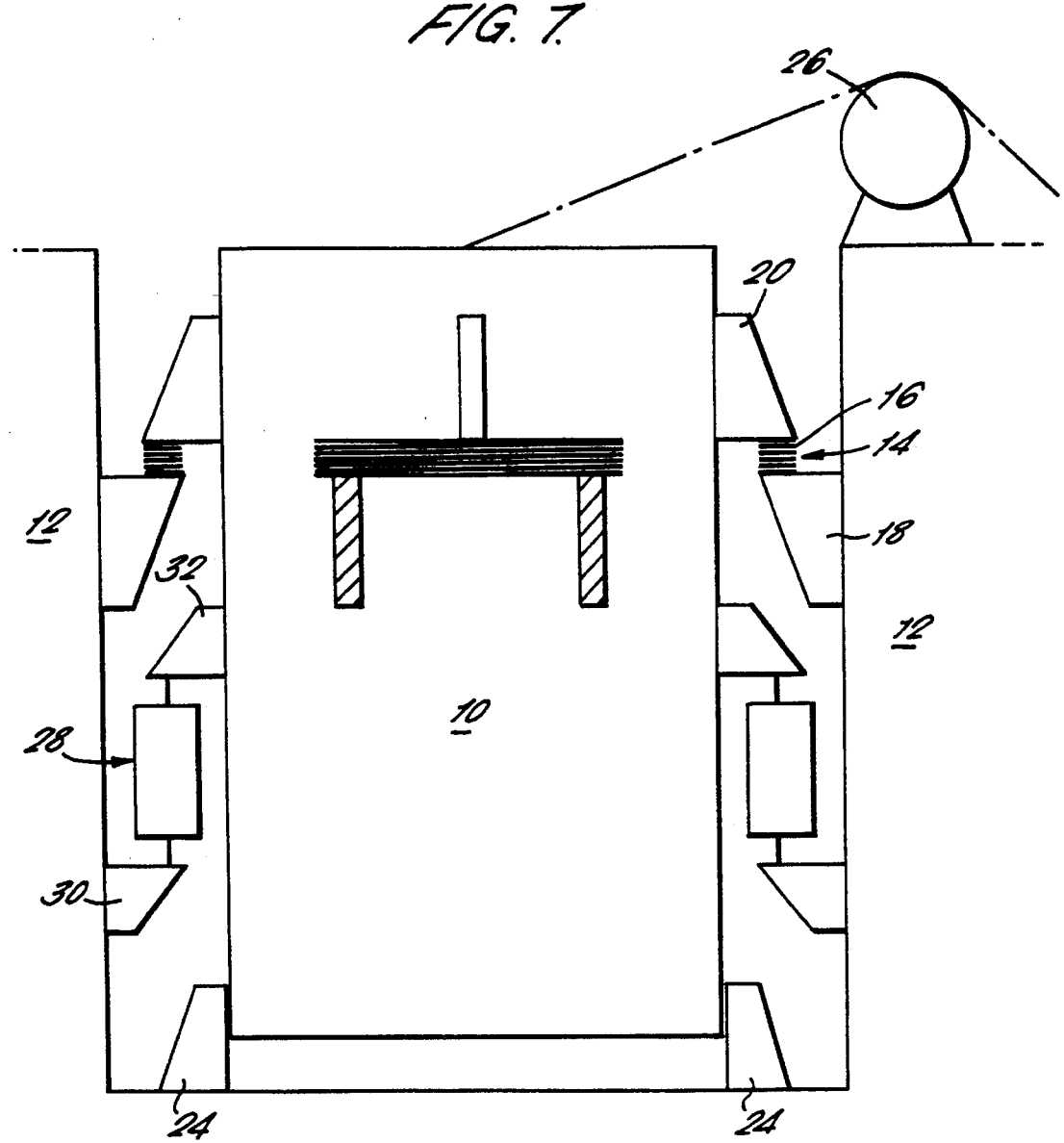

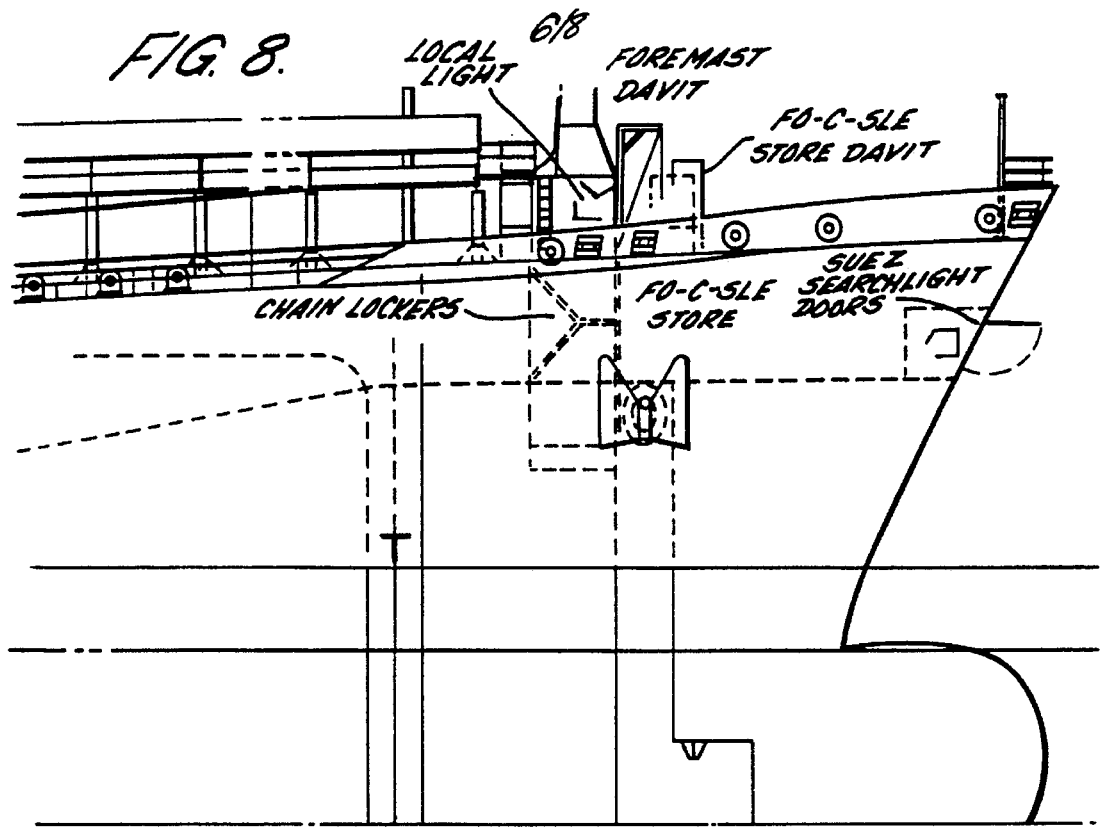
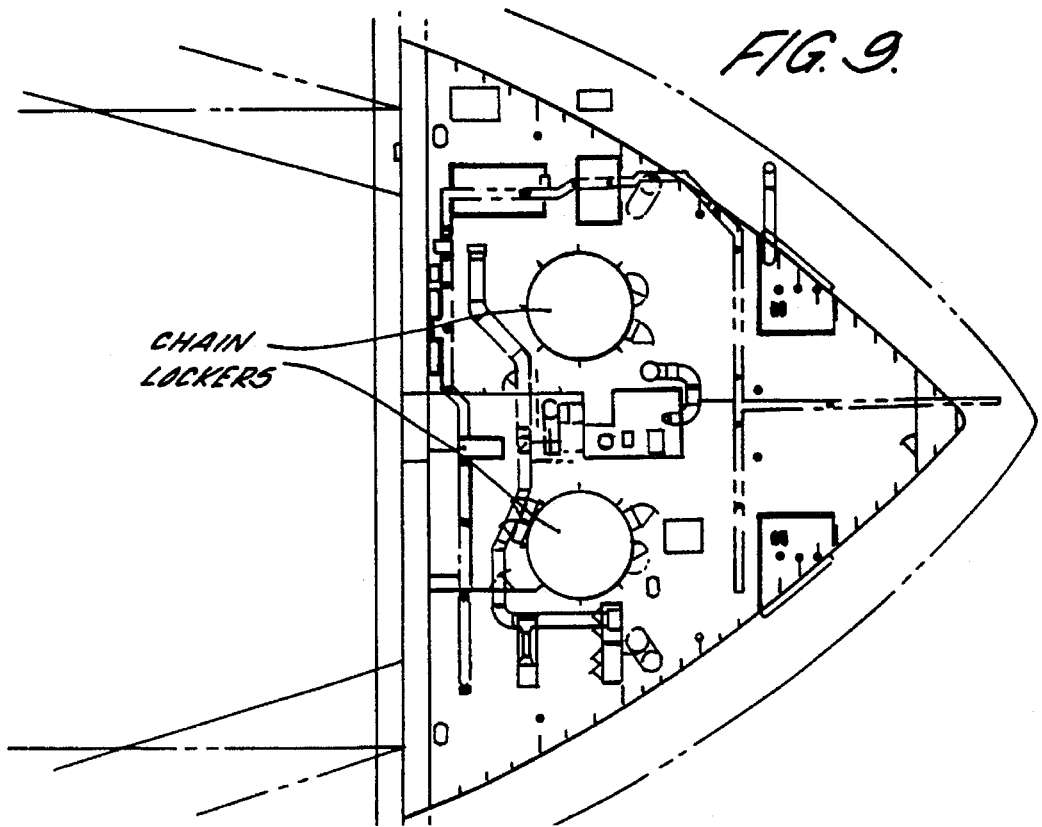

SHIP'S HULL VIBRATION DAMPER

BACKGROUND OF THE INVENTION

The present invention relates to an apparatus for inclusion in a ship to reduce vibrations in the ship's hull and to a ship incorporating such an apparatus. The present invention additionally relates to a method of reducing vibrations in a ship's hull.

It is widely accepted that hull vibrations are capable of giving rise to significant stresses within the structure of a ship which may, in time, lead to structural fatigue and ultimately structural failure. The elmination or reduction of these vibrations is therefore of considerable interest to ship designers.

Hull vibrations span a very large frequency range from the movement of the ship in the seaway through the low frequency hull girder vibrations and the various forms of engine vibration to the higher frequency local vibrations. The means used to eliminate or reduce these vibrations are similarly diverse. The movement of a ship in the seaway, for example, is generally counteracted by the use of stabilisers of which the Denny-Brown is probably the best known design offered commercially. The design relies on the use of hydrofoils on either side of the ship which provide moments that compensate for the action of the waves and thereby reduce the rolling of the ship.

Hull girder vibrations on the other hand, have until recently been thought to be caused exclusively by excitations from the main engines, propellors and other machinery contained within the ship. In particular it has been thought that these vibrations were predominantly excited by the primary and secondary out of balance of the main engine. Balanced main engines have therefore often been fitted to ships to minimise these hull girder vibrations, commonly in combination with a Nishishiba balancer which is used to balance the second order out of balance of the main engine.

More recently however, a better understanding of the importance of wave excitation has been developed and it is now recognised that lower modes of hull girder vibration may also be excited by the action of waves. In a recent experiment conducted during a ship's sea trials a wave-excited, two node mode of vibration was detected at the after end of the ship's hull having an amplitude of 1.78 mm and a frequency of 1.48 Hz, and this on a day when the weather was good and the sea relatively calm. It was calculated that the detected vibration gave rise to a nominal vibration stress in the deck of 2.5N/mm$^2$ while further measurments suggested that the speed of the ship was adversely affected.

It is now thought that the hull girder vibrations may also be excited by processes known as "bottom slamming" and "bow flare slamming" in which, as waves break over the bow of the ship, the buoyancy of the bow section is alternately decreased and increased setting up a transverse standing wave throughout the length of the hull. The amplitude of the vibration is a maximum at the bow where the excitation occurs but can give rise to significant stresses throughout the ship, particularly at deck level both because of the presence of hatches and also because the double bottomed nature of a typical hull provides a much stronger structure. For example the two node mode of vibration in which the wavelength is equal to the length of the ship and both bow and stern are antinodes is thought to give rise to stresses at least as large as those calculated on the basis of the rigid body assumption.

The frequency of hull girder vibrations are primarily determined by the structural stiffness and mass of the hull. Because mass plays a part in determining the frequency of the vibrations it will of course mean that the hull of a ship when loaded will have a different natural frequency than when unloaded. Typically for longer ships however, the frequncy of vibration of the two node mode is between 0.6 Hz and 1.0 Hz whilst for smaller ships the frequency of vibration may be increased to nearer 2.0 Hz. Since under typical sea conditions waves are present from a broad frequency spectrum, it is to be expected that there will always be some waves present capable of stimulating this two node mode of vibration. As ship designers can have no control over the excitation of these vibrations it is considered that the best way of minimising the resulting stresses is to reduce the amplitude of the vibrations by means of damping.

At higher frequencies, modes of hull girder vibration become difficult to distinguish from local vibrations. In this frequency range the most important excitations are usually harmonics of the blade frequency, that is the product of the number of blades provided on the propeller and its rotational speed, and orders corresponding to the number of cylinders in the main engine. These vibrations are relatively difficult to predict with accuracy but as far the propeller is concerned, the vibrations may be limited by using relatively large propeller clearances. This can however result in some loss of propulsive efficiency. As for the engine induced vibrations, axial vibration dampers and various forms of engine stays are just some of the controling means available to the ship designer. The literature available in the art would suggest that vibrations in this frequency range seldom cause major problems but further damping could clearly enhance ship development.

SUMMARY OF THE INVENTION

According to a first aspect of the present invention there is provided an apparatus for inclusion in a ship comprising a mass, means for vibrationally coupling the mass to the ship's hull and means for damping the movement of the mass, the mass being so sized and located as to, when in use, reduce the fundamental and/or harmonics of a transverse two node mode of wave-induced vibration in the ship's hull.

Advantageously the mass is in part comprised of the tackle, fitments or cargo of the ship.

According to a second aspect of the present invention there is provided an apparatus for inclusion in a ship comprising a mass made up in part of the tackle or fitments of the ship, means for vibrationally coupling the mass to the ship's hull and means for damping the movement of the mass so as to, when in use, thereby reduce vibrations in the ship's hull.

Advantageously the mass comprises between approximately 0.2% and approximately 0.5% of the unloaded tonnage of the ship. In a preferred embodiment the mass is in part comprised of a chain locker and that portion of the chain stored therein.

Advantageously the means for vibrationally coupling the mass to the ship's hull comprises a resilient support and in one embodiment comprises at least one spring. In another embodiment the means for vibrationally coupling the mass to the ship's hull comprises a hydragas suspension system. Preferably the hydragas suspension system comprises at least two cylinders disposed in opposed relationship.

Advantageously the mass is coupled to the ship's hull in such a way as to vibrate at a frequency within 10% of the resonant frequency. In a preferred embodiment the mass is coupled to the ship's hull in such a way as to vibrate when the ship is unloaded at a frequency less than the resonant frequency of a mode of vibration that is to be damped. The frequency of vibration of the mass may be varied by altering the magnitude of the mass and/or by altering the stiffness with which the mass is vibrationally coupled to the ship's hull.

Advantageously the means for damping the movement of the mass comprises at least one shock absorber and in a preferred embodiment comprises at least one piston damper.

According to a third aspect of the present invention there is provided a ship incorporating an apparatus comprising a mass, means for vibrationally coupling the mass to the ship's hull and means for damping the movement of the mass, the mass being so sized and located as to, when in use, reduce the fundamental and/or harmonics of a transverse two node mode of wave-induced vibration in the ship's hull.

Advantageously the mass is in part comprised of the tackle, fitments or cargo of the ship.

According to a fourth aspect of the present invention there is provided a ship incorporating an apparatus comprising a mass made up in part of the tackle or fitments of the ship, means for vibrationally coupling the mass to the ship's hull and means for damping the movement of the mass so as to thereby reduce vibrations in the ship's hull.

Advantageously the apparatus is located at a point within one eighth Of a wavelength of an antinode of a mode of vibration that is to be damped such as for example, in the case of wave-induced vibrations, within the bow region of the ship.

According to a fifth aspect of the present invention there is provided a method of reducing the fundamental and/or harmonics of a transverse two node mode of wave-induced vibration in a ship's hull comprising the steps of providing a mass of sufficient size, vibrationally coupling the mass to the ship's hull at an appropriate location and damping the resulting movement of the mass.

According to a sixth aspect of the present invention there is provided a method of reducing vibrations in a ship's hull comprising the steps of identifying a mass made up in part of the tackle or fitments of the ship, vibrationally coupling the mass to the ship's hull and damping the resulting movement of the mass.

BRIEF DESCRIPTION OF THE DRAWINGS

FIG. 6 is a graph illustrating the variation of vibrational amplitude with frequency based on the mathematical model of FIG. 4;

FIG. 7 is a schematic view of an apparatus in accordance with the first aspect of the present invention;

FIG. 8 is a side view of the bow portion of a ship showing the usual position in which chain lockers are located;

FIG. 9 is a plan view of the bow portion of a ship showing the usual position in which chain lockers are located;

DETAILED DESCRIPTION OF THE PREFERRED EMBODIMENTS

Advantageously the mass is coupled to the ship's hull in such a way as to vibrate at a frequency within 10% of the resonant frequency of a mode of vibration that is to be damped. In a preferred embodiment the mass is coupled to the ship's hull in such a way as to vibrate when the ship is unloaded at a frequency less than the resonant frequency of a mode of vibration that is to be damped. The frequency of vibration of the mass may be varied by altering the magnitude of the mass and/or by altering the stiffness with which the mass is vibrationally coupled to the ship's hull.

The first stage in designing a vibration damper is to establish a mathematical model of the vibration. Predictions from the model may then be made and, if actual measurements are available, adjustments incorporated so that the predicted and measured values are in agreement. A damper can then be simulated as an addition to the model and the effect of the damper accurately predicted.

Figure 1:
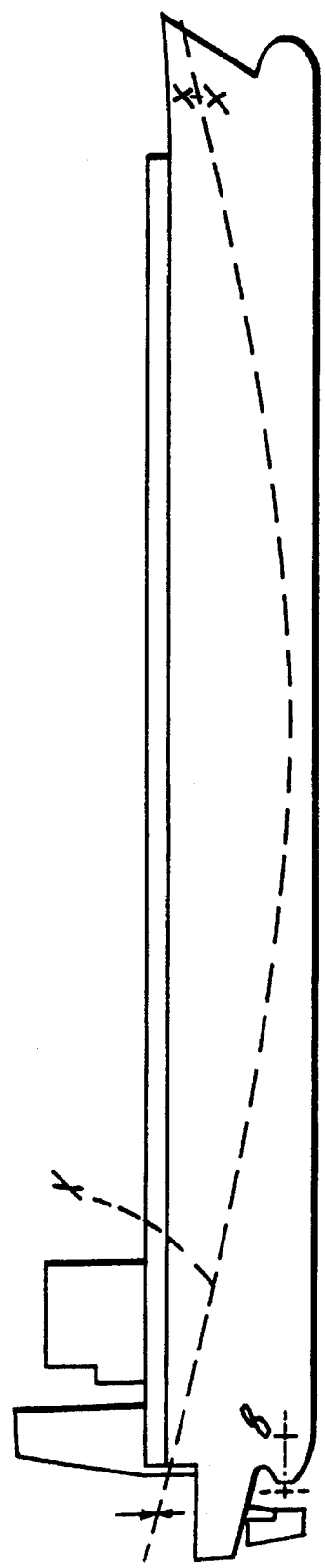
FIG. 1 is a schematic side view of a ship which has undergone sea trials relating to wave induced vibration.
Figure 2:
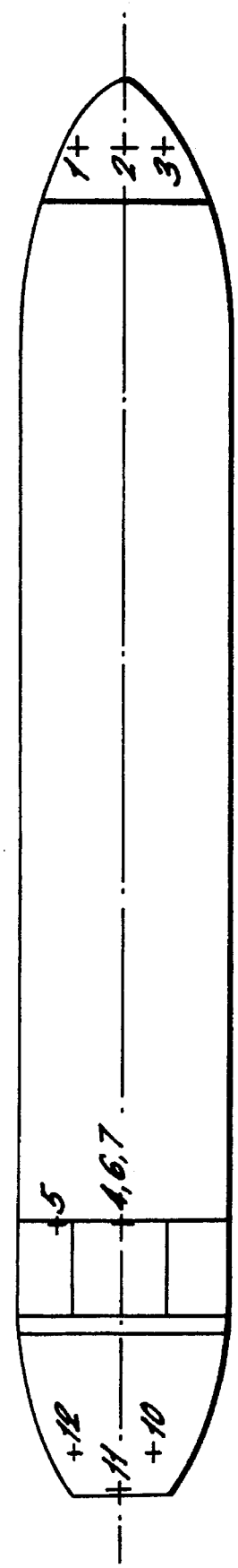
FIG. 2 is a schematic plan view of the ship of FIG. 1.

In order to obtain actual measurements with which to test a future mathematical model, hull girder vibrations are usually measured at about 12 positions throughout the length of the ship and these positions are chosen to obtain the best possible picture of the different modes of vibration. FIGS. 1 and 2, represent respectively a side view and a plan view of the ship previously referred to as having undergone sea trials from which it can be seen that in this particular case, three transducers were placed at the forward end of the ship, three at the after end, four at the bridge top and one on the stern tube forward gland. In addition a revolutionary marker was used to monitor the propeller revolutions and provide a time signal.

The signals from the transducers were captured on a high quality tape recorder having the required number of channels and a frequency response suitable for the vibrations in question. Afterwards the signals could be played back in the same way as they were captured taking care to ensure their correct callibration.

Figure 3:
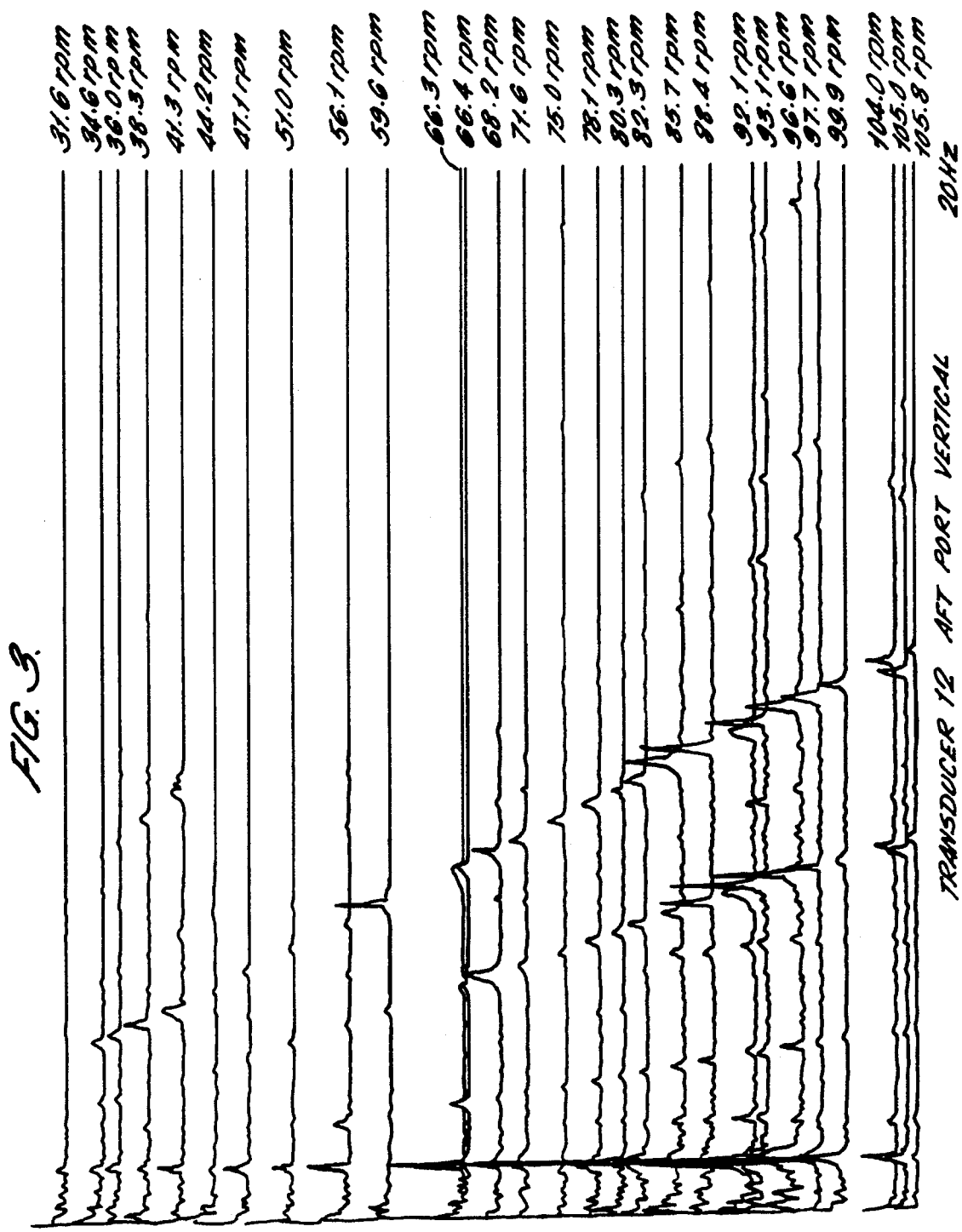
FIG. 3 is a series of graphs showing the way in which the vibrational spectrum at a particular point on the ship varies with increasing engine speed.

Measurements were carried out with the ship travelling at different speeds and since in each case measurements were taken from 12 positions, a large volume of date was stored on the tape recorder. A proper analysis of data collected in this way can be a formidable task in that it requires an understanding of the vibration characteristics of a ship as well as the use of the best available instruments such as Fast Fourier Transform analysers. FFT analysers are used to extract the significant vibrational frequencies from the records stored on the tape recorder and these are then further analysed using a computer. A typical result is shown in FIG. 3 in which the two node mode of vibration is clearly visible. The engine and propeller excited vibrations are also clearly distinguishable as for these vibrations the frequency is proportional to engine speed.

Figure 4:
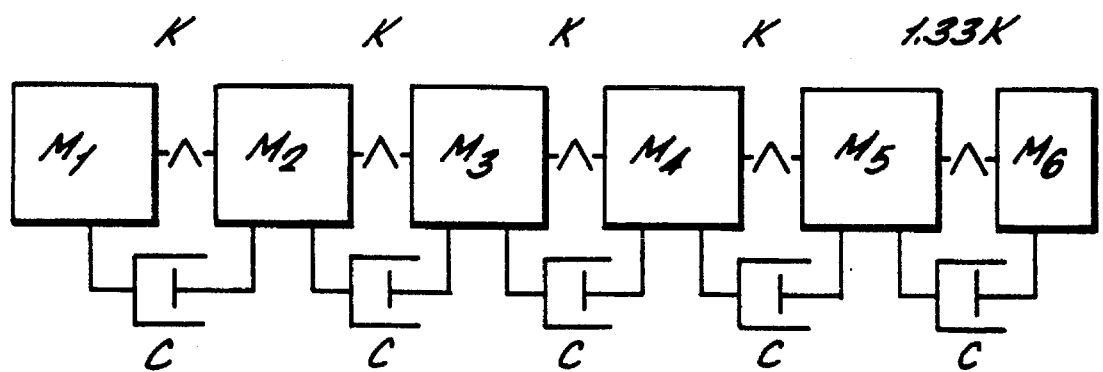
FIG. 4 is a schematic illustration of a mathematical model of a vibrating ship.

Turning now to the establishment of a mathematical model, the two node mode of vibration of the ship referred to above as having undergone sea trials will be represented to a first approximation by the six mass system shown in FIG. 4.

When considering the vibrational chacteristics of a ship it is necessary to take into account not only the action of the surrounding water on the ship but also the action of the ship on the surrounding water. This is done by reference to the virtual mass of the ship which is the sum of the displacement of the ship, in the present case 32,672 tonnes, and an added mass. The British Ship Research Association have established a method of determining the value of the added mass in particular instances and in the present case the virtual mass of the ship was calculated to be 90,044 tonnes. The sum of the six masses in the representative system was therefore made equal to the vitual mass of the ship and the stiffness of the system arranged so as to yield the measured natural frequency of 1.04 Hz. The Holzer table shown below gives the calculated modal shape of the system. This is to be compared with the measured modal shape shown as a dashed line in FIG. 1 and it will be seen that the predicted and measured results are in agreement.

TABLE 1

HOLZER FREQUENCY TABLE
II-Node: 62.5 VPM, $\omega$ 6.545 1/sec, $\omega^2$ = 42.837 1/sec$^2$.

| No. | Mass tonne | $M\omega^2$ tonne/sec$^2$ | $\Delta_n$ mm | $M\omega^2\Delta_n$ t.mm/s$^2$ | $\Sigma M\omega^2\Delta_n$ t.mm/s$^2$ | $K_n$ N/mm | $\Delta_n-\Delta_{n-1}$ mm |
| --- | --- | --- | --- | --- | --- | --- | --- |
| 1 | 16371 | 701285 | 1.000 | 701285 | 701285 | 586000 | 1.197 |
| 2 | " | " | −0.197 | −138153 | 563132 | " | 0.961 |
| 3 | " | " | −1.158 | −812088 | −248956 | " | −0.425 |
| 4 | " | " | −0.733 | −514042 | −762998 | " | −1.302 |
| 5 | " | " | 0.569 | 399031 | −363967 | 779380 | −0.467 |
| 6 | 8186 | 350663 | 1.036 | 363287 | −680 | | |

Figure 5:
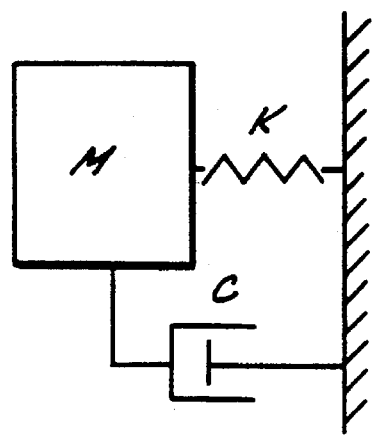
FIG. 5 is a schematic illustration of a simplified version of the mathematical model of FIG. 4.

It is common practice to represent the damping of a vibration system as a dynamic amplification factor which is calculated by modelling the system as a single mass system as shown in FIG. 5. This approach has been adopted in the past by the British Ship Research Association and using their results it is possible to estimate that the dynamic amplification factor in the present case would have a value between 160 and 320.

For the purpose of designing a vibration damper it is convenient to represent the damping as a damping force proportional to the velocity of the vibration, ie. to assume that the damping is viscous. For the single mass system shown in FIG. 5 the damping force may be represented by a dashpot in parallel with the spring. The relationship between the damping constant and the amplification factor at resonance is given by:

$$C_s = m \cdot w_0/k_m = k/w_0 \cdot k_m$$

where $C_s$=damping constant, m=mass of the system, k=stiffness of the spring, $k_m$=dynamic amplification factor at resonance, $w_0$=natural frequency.

Substituting the limiting values of the amplification factor obtained from the British Ship Research Association, the following values are obtained for the damping constant $C_s$:

$k_m$=160, $C_s$=3684 tonne/sec $k_m$=320, $C_s$=1842 tonne/sec

The next stage in the preparation of data for the six mass system is to calculate the damping constants from the damping constant obtained for the single mass system. For this purpose it will be assumed that the vibrational energy absorbed by the single mass system is the same as the vibrational energy absorbed by the six mass system. Thus:

$$C[(\Delta_1-\Delta_2)^2+(\Delta_2-\Delta_3)^2+(\Delta_3-\Delta_4)^2+(\Delta_4-\Delta_5)^2+1.33\ (\Delta_5-\Delta_6)^2]=C_s$$

Using the data from Table 1:

$$C[1.197^2 0.961^2+0.425^2+1.302^2+1.33\times0.467^2]=3684$$

C=814 tonne/sec

Similarly, when $k_m$=320, C=407 tonne/sec.

The wave excitation can be obtained with sufficient accuracy as follows. It will be seen from the measured modal shape in FIG. 1 that for an amplitude of 1.78 mm at the transducer the amplitude at the centre of $M_1$ will be 1.3 mm. Assuming that the wave excitation occurs at $M_6$ and that it can be represented by a single force varying sinusoidally, the magnitude of this force can be calculated since:

$$1.3=F\Delta_6/w\ (4.523C)=1.036F/(6.545\times3684)$$

Therefore: F=30,256N

Similarly, when $K_m$=320, F=15,128N

The projected area of the bulbous bow in the horizontal plane is approximately 30 m$^2$ The above force therefore corresponds to a pressure variation of:

30,256/30=1009N/m$^2$=approximately 0.01 bar or 0.1 meter of water

It seems reasonable that the waves could present this variation in head of water to the projected area of the bulbous bow in the sea conditions reported.

This completes the treatment of the undamped vibrational model of the ship shown in FIG. 1. A forced-damped calculation was performed on the system and the results are shown in FIG. 6. For the purpose of this calculation it was assumed that the applied force remained constant throughout the frequency range and it will be seen that a maximum amplitude of 1.3 mm is reached at a frequency of 1.04 Hz which confirms the figures used in the vibrational model. It should also be noted the flanks are higher for higher values of the damping constant which in the present case correspond to higher values of applied force.

An embodiment of the present invention will now be described by way of example with reference to the accompanying drawings in which:

FIG. 7 is a schemtic view of an apparatus in accordance with the first aspect of the present invention; and FIGS. 8 and 9 are respectively a side view and a plan view of the bow portion of a ship and show the usual position of chain lockers on board a ship.

The apparatus shown in FIG. 7 comprises a mass 10 coupled to a ship's hull 12 by means of a resilient support system 14.

The mass 10 preferably comprises between approximately 0.2% and approximately 0.5% of the ship's unloaded tonnage. Since the inclusion in a ship of an additional mass of this order would have a detrimental effect on the ship's overall performance, the mass 10 is preferably comprised of items already on board the ship and serving other purposes such as the ship's tackle, fitments or cargo. It is to be noted however that if the mass 10 is in part comprised of the cargo of the ship, then when the ship is unloaded the mass 10 will be reduced in magnatude and necessitate the use of one or more ballast tanks to compensate for this fact.

In the embodiment shown in FIG. 7, the mass is comprised of a chain locker and that portion of the chain stored in the locker. Typically a ship may possess two anchor chains disposed on opposite sides of the ship close to the bow with each anchor chain having a mass of typically 44.5 tonnes. Allowing for the mass of the chain lockers therefore, the combined mass of the two chain lockers and the chains they contain may typically be of the order of 90 tonnes.

The resilient support system 14 used to couple the mass 10 to the ship's hull 12 may typically comprise a number of springs. 16 disposed between first and second projections 18 and 20 connected respectively to the ship's hull 12 and the peripheral surface of the mass 10. The springs 16 may be of any suitable design and in FIG. 7 are shown as being similar to the suspension springs used in railway carriages or heavy duty lorries.

The stiffness of the springs 16 and the magnitude of the mass 10 together determine the natural frequency of the apparatus. This natural frequency is arranged so as to be within 20%, or more preferably 10%, of the resonant frequency of the wave-induced mode of vibration in the ship's hull 12 that is to be damped. In order to accomplish this tuning of the apparatus the magnitude of the mass 10 may be variable. Thus if the mass 10 were to in part comprise a chain locker and that portion of the chain stored therein, as shown in FIG. 7, different lengths of chain may be stored in the locker to facilitate the tuning of the apparatus. A weight gauge (not shown) may be provided to measure the magnitude of the mass 10 thereby aiding the tuning process. Unfortunately, to change the natural frequency of the apparatus by 10% would require a change of 20% in the magnitude of the mass 10 making such a method of tuning cumbersome and inefficient.

In a preferred arrangement therefore, the apparatus is tuned by selecting the springs 16 to be an appropriate stiffness. This is possible because in each of the different modes of wave-induced vibration the resonant frequency of the ship's hull 12 is primarily determed by its structural stiffness and is therefore a constant for any given ship. Thus at the time the apparatus is installed in the ship the mode of wave-induced vibration to be damped may be selected and the springs 16 chosen accordingly.

Having said that however, the mass of the ship does have a slight effect on the resonant frequency of the ship's hull 12 so the springs 16 are preferably selected so as to have a stiffness that will result in the natural frequency of the apparatus being less than the resonant frequency of the mode of vibration of the ship's hull 12 that is to be damped when the ship is unloaded. Thus when the ship is loaded the apparatus will vibrate with a natural frequency closer to the resonant frequency of the mode of vibration of the ship's hull 12 that is to be damped.

In practice the apparatus is deliberately tuned so as to have a natural frequency slightly different from that of the resonant frequency of the mode of vibration of the ship's hull 12 that is to be damped in order to prevent the mass 10 from oscillating with too large an amplitude. This difference in frequency obviously has an adverse effect on the performance of the apparatus in reducing the wave-induced vibrations in the ship's hull 12 but does provide a degree of protection for the springs 16.

When correctly tuned, the mass 10 will oscillate driven by the wave-induced vibrations in the ship's hull 12 although the efficiency with which the mass 10 is driven is dependant upon its location relative to the ship. Clearly the mass 10 will oscillate with a larger amplitude when it is placed close to an antinode of the driving vibration and will not oscillate at all if placed at a node. In general the apparatus will operate efficiently if the mass 10 is disposed within one eighth of a wavelength of an antinode of the mode of vibration of the ship's hull 12 that is to be damped. Since different modes of wave-induced vibrations in the hull 12 all have an antinode at the bow, this provides a further argument for the mass 10 to comprise at least in part a chain locker and that portion of the chain stored therein since as FIGS. 8 and 9 show, chain lockers are commonly located close to the bow of the ship.

As shown in FIG. 7 the mass 10 is constrained to vibrate reciprocally by means of guides 24 disposed on opposite sides of the mass 10 and secured to the ship's hull 12. The oscillatory/motion of mass 10 will preclude living space or sensitive machinery from being situated on the mass 10. Likewise this movement will make it difficult to provide pipe and/or electrical connections across the springs 16 to the mass 10. This highlights yet a further reason why the mass 10 should at least in part comprise a chain locker and that portion of the chain stored therein since such lockers tend not to have any sensitive apparatus mounted on them and the chain is typically the only mechanical connection between the locker and the rest of the ship. All that is necessary is for the length of the chain between the locker and its associated winch 26 to be able to accommodate the oscillations of the locker.

In order to damp the wave-induced vibrations in the ship's hull 12, means 28 are provided to damp the oscillations of the mass 10. The damping means 28 may typically comprise one or more shock absorbers disposed between third and fourth projections 30, 32 connected respctively to the ship's hull 12, and the peripheral surface of the mass 10. The shock absorbers may be of any suitable design and are shown in FIG. 7 to comprise a piston damper similar to that found in trains or heavy duty lorries.

Figure 10:
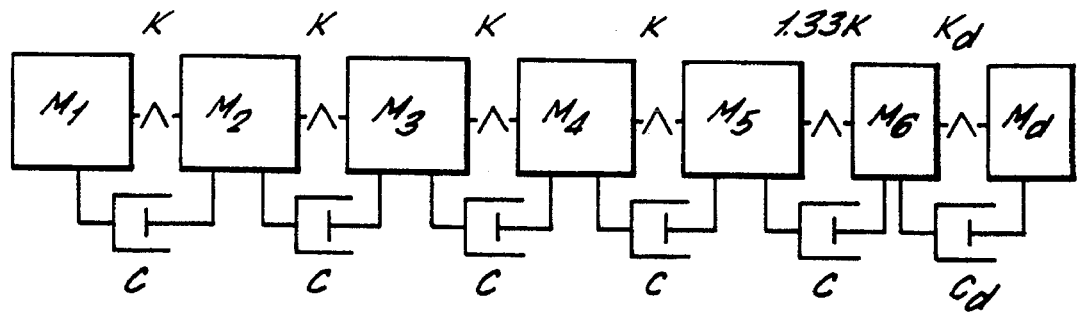
FIG. 10 is a schematic illustration of a further mathematical model of a vibrating ship.

Returning to the mathematical model discussed previously, a ship incorporating an apparatus in accordance with the first aspect of the present invention may be represented to a first approximation by the system shown in FIG. 10.

As has been seen the two chain lockers are situated almost on the centre line of $M_6$ and have a combined mass of approximately 90 tonnes. Hence treating the mass of $M_6$ separately from that of the two chain lockers:

$M_6$=8096 tonne and $M_7$=90 tonne $C_6$=3880N/mm

Figure 11:
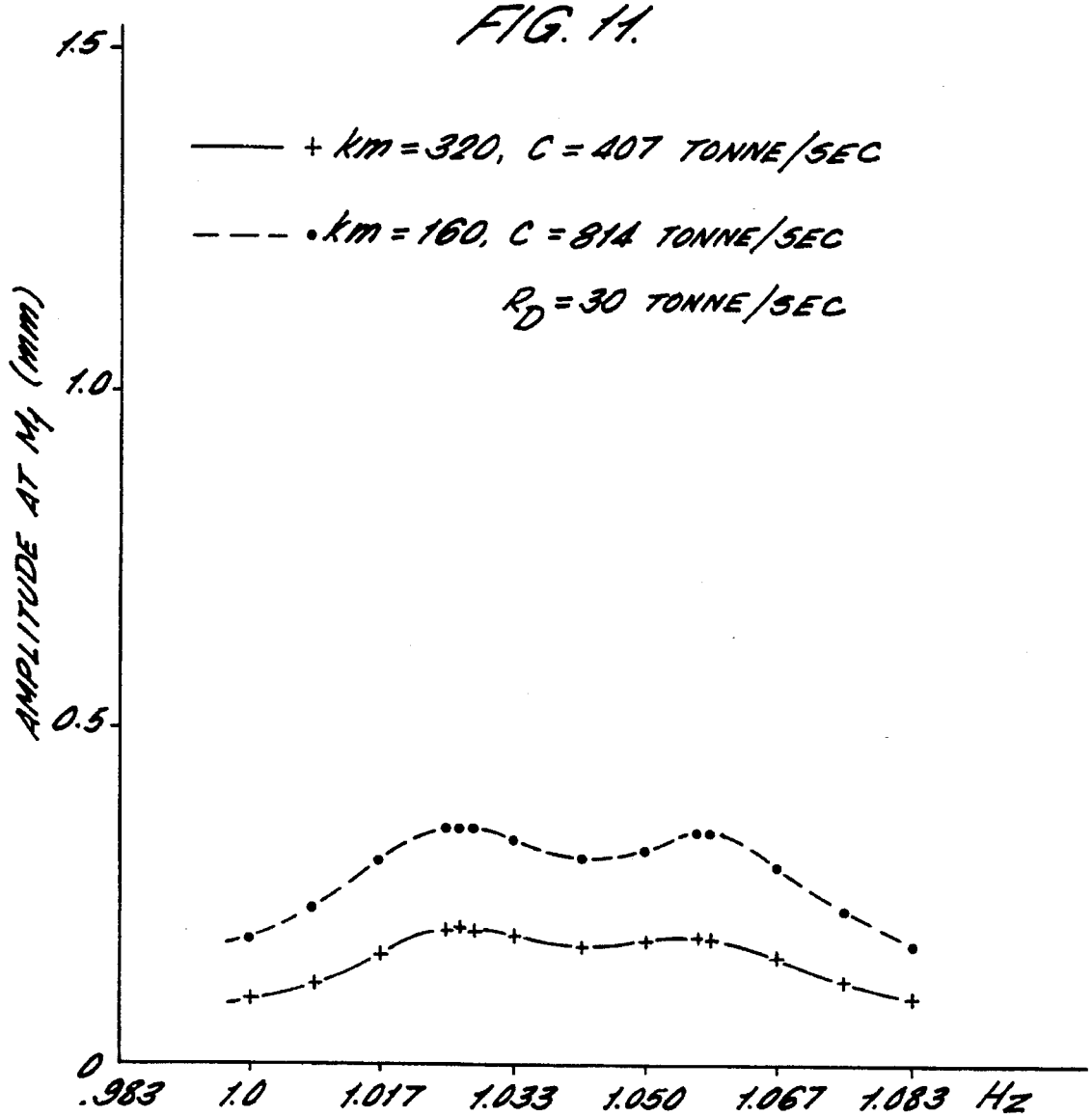
FIG. 11 is a graph illustrating the variation of vibrational amplitude with frequency based on the mathematical model of FIG. 10.

Assuming the apparatus to be tuned to the resonant frequency of the two node mode of wave-induced vibrations in the hull 12, a series of forced-damped calculations may be performed to obtain a value for the optimum damping constant at which the amplitude of vibration at $M_1$ is a minimum. The results of these calculations are shown in FIG. 11 from which it can be seen that the maximum amplitude of vibration at $M_1$ has been reduced to 0.195 mm assuming the original value of $K_m$ to have been 320. If however, the original value of $k_m$ was 160, the maximum amplitude of vibration at $M_1$ would have been reduced to 0.345 mm. In both cases the apparatus described provides a significant reduction in the amplitude of the two node mode of vibration. The value of the damping constant of the apparatus described was 30 tonne/sec.

The maximum movement across the apparatus under the above conditions is given by:

For $k_m=160$, $\Delta_7-\Delta_6=6.127$ mm

For $k_m=320$, $\Delta_7-\Delta_6=3.478$ mm

It will be remembered that this vibration gave rise to an nominal hull girder stress of $2.5N/mm^2$, and this in relatively good conditions. It has been predicted that "bottom slamming" and "bow flare slamming" could cause stresses of the order of $300N/mm^2$ in bad weather which would correspond to a maximum movement of:

For $k_m=160$, maximum movement=$6.127 \times 300/2.5$ =735 mm

For $k_m=320$, maximum movement=$3.478 \times 300/2.5$ =417 mm

In order to reduce this maximum movement a larger mass 10 or a greater than optimum damping might be used. Alternatively the apparatus might be deliberately de-tuned.

Figure 12:
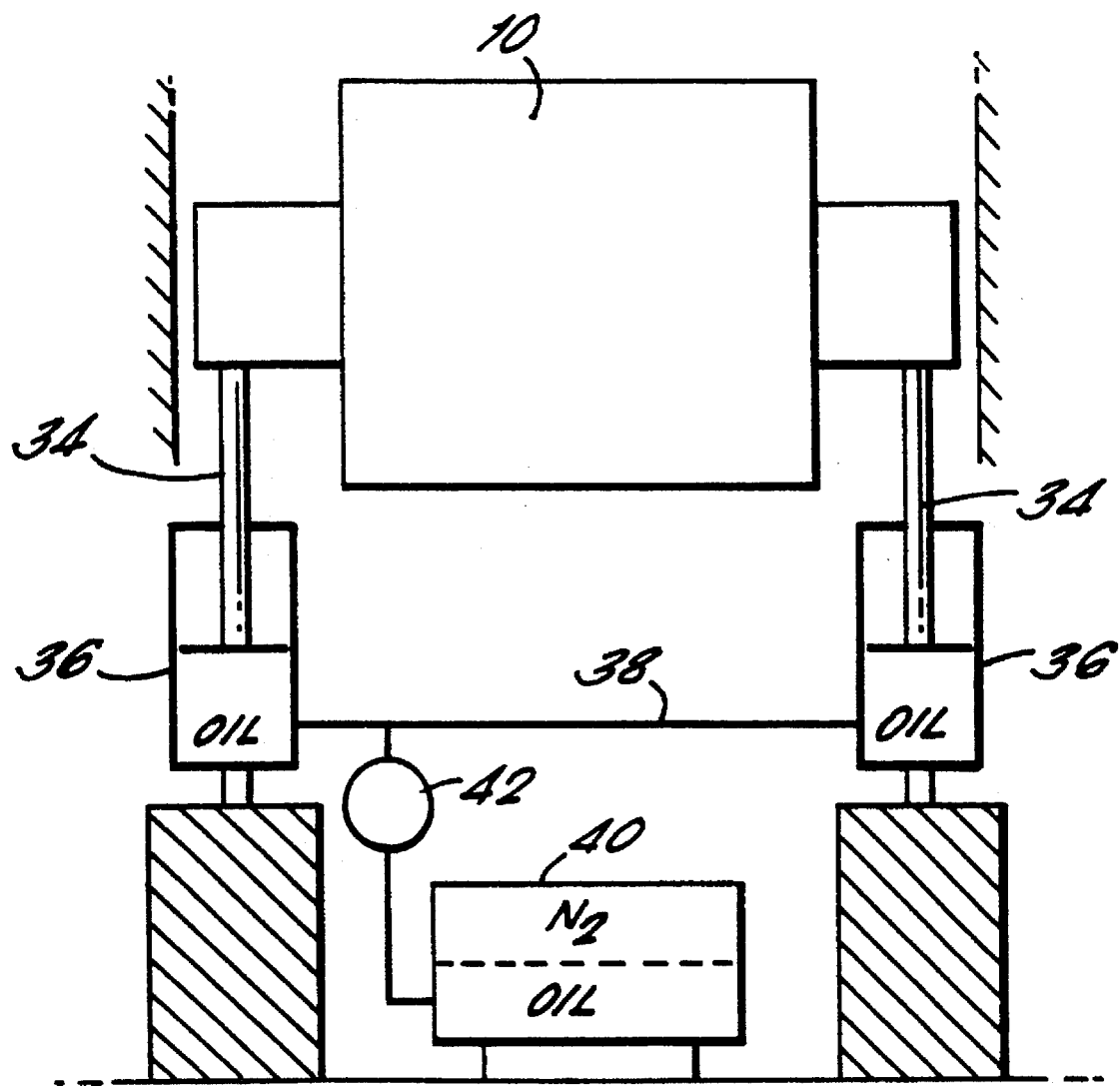
FIG. 12 is a schematic view of a hydragas suspension system in place of the springs of the apparatus of FIG. 7.

In another arrangement however this maximum movement might be accommodated by replacing the springs 16 of the embodiment shown in FIG. 7 with a hydragas suspension system. One such system is shown schematically in FIG. 12 to comprise two piston rods 34 which are each mounted for reciprocating motion within respective oil-filled cylinders 36. These cylinders 36 are arranged so as to be in communication with each other by means of an interconnecting pipe network 38 and in communication with a further cylinder 40 by way of a valve 42. This further cylinder 40 is in turn arranged to be partly filled with oil and partly filled with nitrogen gas.

In use the weight of the mass 10 is supported by the two piston rods 34 which in turn are supported by the pressure within the oil/nitrogen cylinder 40. The flexibility, and therefore stiffness, of the hydragas system derives from the compressability of the nitrogen gas contained within the oil/nitrogen cylinder 40. Thus it will be apparent that by varying the volume of the nitrogen gas contained within the cylinder 40 the stiffness of the system may be adjusted to any desired value within certain limits imposed by the dimensions of the system as a whole. This change in volume of the nitrogen gas may be achieved by the provision of a piston within the oil/nitrogen cylinder 40 or by connecting the oil/nitrogen cylinder 40 to a reservoir of nitrogen gas via a second valve and/or pump.

Such a hydragas system could therefore not only be designed to accommodate the maximum movement that would be likely to be encountered but could also provide a particularly simple way of adjusting the stiffness with which the mass 10 is coupled to the ship's hull 12 and thus the natural frequency of the apparatus as a whole.

A further advantage of the proposed hydragas system is that it is a simple matter to provide such a system with the necessary cooling to counter the heat generated when the mass 10 is vibrating with a particularly large amplitude. The same however is not true in the case of a rubber suspension system or one comprising one or more mechanical springs.

It will be apparent to those skilled in the art that whilst a hydragas suspension system has been shown comprising two interconnected oil-filled cyclinders 36, the number of oil-filled cylinders need not be limited in this way. Indeed any desired number of cylinders may be used. It will also be apparent that the oil-filled cylinders 36 comprised within a hydragas suspension system need not necessarily be arranged in the same orientation. Thus some of the oil-filled cylinders 36 may be arranged opposite others within the system such that as the mass 10 is displaced in one direction some of the piston rods 34 associated with the cylinders move upwardly while others move downwardly. In this way it is possible to provide a suspension system having a greater range of possible stiffness and stroke.

It will also be apparent to those skilled in the art that a hydragas suspension system need not necessarily be used in isolation but may instead be used in conjunction with springs and/or rubber components of the type previously described.

As has been previously stated, ships typically posess two chains and chain lockers disposed close to the bow and each of their masses may be used in one of two seperate apparatus designed to reduce the amplitude of two seperate modes of wave-induced vibrations in the ship's hull. However one of the disadvantages with this arrangement is that the mass in any one of the two apparatus is effectively halved while in addition the independant oscillation of two such masses at the bow of the ship may cause a twisting motion detrimental to the ship's performance.

It will be apparrant to those skilled in the art that whilst an embodiment of the present invention has been described with particular reference to the two node mode of wave-induced vibrations, the apparatus of the present invention is capable of damping any desired mode of hull vibration.

What is claimed:

1. An apparatus for inclusion in a ship comprising a mass at least in part comprised of a chain locker and that portion of the chain stored therein and having a hull vibrating at fundamental and harmonic frequencies of a transverse two node mode of wave induced vibration, means for vibrationally coupling the mass to the ship's hull and means for damping the movement of the mass, the mass being so sized and located as to, when in use, reduce the fundamental and/or harmonic frequencies of the transverse two node mode of wave-induced vibration in the ship's hull.

2. An apparatus in accordance with claim 1, wherein the mass is in part comprised of tackle, fitments or cargo of the ship.

3. An apparatus for inclusion in a ship having a hull, the apparatus comprising a mass at least in part comprised of a chain locker and that portion of the chain stored therein, means for vibrationally coupling the mass to the ship's hull and means for damping the movement of the mass so as to, when in use, thereby reduce vibrations in the ship's hull.

4. An apparatus in accordance with claim 3, wherein the mass comprises between approximately 0.2% and approximately 0.5% of the unloaded tonnage of the ship.

5. An apparatus in accordance with claim 3, wherein the means for vibrationally coupling the mass to the ship's hull comprises a resilient support.

6. An apparatus in accordance with claim 3, wherein the means for vibrationally coupling the mass to the ship's hull comprises at least one spring.

7. An apparatus in accordance with claim 3, wherein the means for vibrationally coupling the mass to the ship's hull comprises a hydragas suspension system.

8. An apparatus in accordance with claim 7, wherein the hydragas suspension system comprises at least two cylinders disposed in opposed relationship.

9. An apparatus in accordance with claim 3, wherein the mass is coupled to the ship's hull in such a way as to vibrate at a frequency within 10% of the resonant frequency of a mode of vibration that is to be damped.

10. An apparatus in accordance with claim 3, wherein the mass is coupled to the ship's hull in such a way as to vibrate when the ship is unloaded at a frequency less than the resonant frequency of a mode of vibration that is to be damped.

11. An apparatus in accordance with claim 3, wherein the frequency of vibration of the mass may be varied by altering the stiffness with which the mass is vibrationally coupled to the ship's hull.

12. An apparatus in accordance with claim 3, wherein the frequency of vibration of the mass may be varied by altering the magnitude of the mass.

13. An apparatus in accordance with claim 3, wherein the means for damping the movement of the mass comprises at least one shock absorber.

14. An apparatus in accordance with claim 3, wherein the means for damping the movement of the mass comprises at least one piston damper.

15. A ship having a hull which vibrates in a transverse two node mode from wave-induced vibration having a fundamental frequency and harmonic frequencies incorporating an apparatus comprising a mass at least in part comprised of a chain locker and that portion of the chain stored therein, means for vibrationally coupling the mass to the ship's hull and means for damping the movement of the mass, the mass being so sized and located as to, when in use, reduce at least one of the fundamental and harmonic frequencies of the transverse two node mode of wave-induced vibration in the ship's hull.

16. A ship in accordance with claim 15, wherein the mass is in part comprised of at least one of a plurality of components comprising tackle, fitments and cargo of the ship.

17. A ship having a hull and incorporating an apparatus comprising a mass at least in part comprised of a chain locker and that portion of the chain stored therein, means for vibrationally coupling the mass to the ship's hull and means for damping the movement of the mass so as to thereby reduce vibrations in the ship's hull.

18. A ship in accordance with claim 17, wherein the apparatus is located at a point at which the amplitude of a mode of vibration that is to be damped is significant.

19. A ship in accordance with claim 17, wherein the apparatus is located at a point within one eighth of a wavelength of an antinode of a mode of vibration that is to be damped.

20. A ship in accordance with claim 17, wherein tile apparatus is located within a bow region of the ship.

21. A method of reducing at least one of fundamental and harmonic frequencies of a transverse two node mode of wave-induced vibration in a ship's hull comprising the steps of providing a mass of a sufficient size wherein the mass is at least in part comprised of a chain locker and that part of the chain stored therein, vibrationally coupling the mass to the ship's hull at an appropriate location and damping the resulting movement of the mass.

22. A method of reducing vibrations in a ship's hull comprising the steps of identifying a mass at least in part comprised of a chain locker and that part of the chain stored therein, vibrationally coupling the mass to the ship's hull and damping the resulting movement of the mass.

23. A method in accordance with claim 21, wherein the mass is coupled to the ship's hull in such a way as to vibrate at a frequency within 10% of the resonant frequency of a mode of vibration that is to be damped.

24. A method in accordance with claim 21, wherein tile mass is coupled to the ship's hull in such a way as to vibrate when the ship is unloaded at a frequency less than the resonant frequency of a mode of vibration that is to be damped.

25. A method in accordance with claim 21, wherein the frequency of vibration of the mass may be varied by altering the magnitude of the mass.

26. A method in accordance with claim 21 wherein the frequency of vibration of the mass may be varied by altering the stiffness with which the mass is vibrationally coupled to the ship's hull.

* * * * *

UNITED STATES PATENT AND TRADEMARK OFFICE
CERTIFICATE OF CORRECTION

PATENT NO.   : 5,586,512
DATED        : December 24, 1996
INVENTOR(S)  : Finn Orbeck It is certified that error appears in the above-indentified patent and that said Letters Patent is hereby corrected as shown below:

Column 12, line 27, cancel "tile" and insert --the--.

Signed and Sealed this

Fourteenth Day of October, 1997

Attest:

BRUCE LEHMAN

*Attesting Officer*        *Commissioner of Patents and Trademarks*